(12) United States Patent
Montero et al.

(10) Patent No.: US 12,470,499 B2
(45) Date of Patent: Nov. 11, 2025

(54) MANAGING OPERATION OF A DATA PROCESSING SYSTEM USING A MANAGEMENT CONTROLLER AND A NETWORK MODULE

(71) Applicant: Dell Products L.P., Round Rock, TX (US)

(72) Inventors: Adolfo Sandor Montero, Pflugerville, TX (US); Abeye Teshome, Austin, TX (US); Richard M. Tonry, Georgetown, TX (US); Bassem El-Azzami, Austin, TX (US); Mohit Arora, Frisco, TX (US); Vinodkumar Vasudev Ottar, Mckinney, TX (US); Luis Antonio Valencia Reyes, Waxahachie, TX (US); Rajaravi Chandra Kollarapu, Allen, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/498,357

(22) Filed: Oct. 31, 2023

(65) Prior Publication Data
US 2025/0141814 A1 May 1, 2025

(51) Int. Cl.
*H04L 47/80* (2022.01)
*H04L 47/78* (2022.01)

(52) U.S. Cl.
CPC .......... *H04L 47/801* (2013.01); *H04L 47/781* (2013.01)

(58) Field of Classification Search
CPC ............................... H04L 45/00; H04L 45/56
See application file for complete search history.

(56) References Cited

U.S. PATENT DOCUMENTS

| | | |
|---|---|---|
| 7,457,277 B1 * | 11/2008 | Sharma .............. H04Q 11/0062 370/395.51 |
| 7,599,907 B2 | 10/2009 | Havewala et al. |
| 8,020,192 B2 | 9/2011 | Wright et al. |
| 8,490,163 B1 | 7/2013 | Harsell et al. |
| 8,850,186 B2 | 9/2014 | Yamauchi |
| 9,191,781 B2 | 11/2015 | Kumar |
| 9,246,678 B2 | 1/2016 | Nayshtut et al. |
| 9,349,009 B2 | 5/2016 | Rivera |
| 9,721,111 B2 | 8/2017 | Cavanaugh |
| 9,721,175 B2 | 8/2017 | Kursun et al. |
| 9,785,491 B2 | 10/2017 | Cilfone et al. |
| 10,021,669 B2 | 7/2018 | George |
| 10,163,105 B1 | 12/2018 | Ziraknejad et al. |

(Continued)

*Primary Examiner* — Chirag R Patel
(74) *Attorney, Agent, or Firm* — WOMBLE BOND DICKINSON (US) LLP

(57) ABSTRACT

Methods and systems for managing a data processing system are disclosed. To manage the data processing system, a management controller may be included in the data processing system. The management controller may perform managerial functions for the data processing system regardless of whether in band components are compromised, depowered, and/or otherwise non-functional. In addition, to communicate with remote entities, the management controller may utilize a network module of the data processing system. The network module may direct network traffic between in band and out of band communication channels and may operate independently from hardware resources of the data processing system.

20 Claims, 6 Drawing Sheets

(56) References Cited

U.S. PATENT DOCUMENTS

| | | | |
|---|---|---|---|
| 10,169,571 | B1 | 1/2019 | Attfield et al. |
| 10,177,795 | B1 * | 1/2019 | Frishman ............ G06F 11/1004 |
| 10,395,039 | B2 | 8/2019 | Khatri et al. |
| 10,630,489 | B2 | 4/2020 | Hughes |
| 10,678,555 | B2 | 6/2020 | Johansson et al. |
| 10,841,295 | B1 | 11/2020 | Pecen et al. |
| 11,563,565 | B2 | 1/2023 | Yang et al. |
| 11,704,384 | B2 | 7/2023 | Murphy et al. |
| 2003/0231594 | A1 * | 12/2003 | Xu ...................... H04L 47/2408 370/236 |
| 2007/0237084 | A1 * | 10/2007 | Rothman ................ H04L 69/14 709/239 |
| 2013/0128729 | A1 * | 5/2013 | Nair .................... H04L 41/0213 370/229 |
| 2013/0326039 | A1 * | 12/2013 | Shah ..................... G06F 13/128 709/223 |
| 2016/0349827 | A1 * | 12/2016 | Idgunji ................ G06F 1/3287 |
| 2017/0277876 | A1 | 9/2017 | Alameh et al. |
| 2017/0289197 | A1 | 10/2017 | Mandyam et al. |
| 2018/0006829 | A1 | 1/2018 | Kravitz et al. |
| 2019/0156019 | A1 | 5/2019 | Chen |
| 2020/0293459 | A1 * | 9/2020 | Gnanasambandam ...................... G06F 18/22 |
| 2021/0141626 | A1 * | 5/2021 | Ladkani ................ G06F 3/0676 |
| 2022/0100247 | A1 * | 3/2022 | Garg .................... G06F 1/3203 |
| 2022/0222328 | A1 | 7/2022 | Talib et al. |

\* cited by examiner

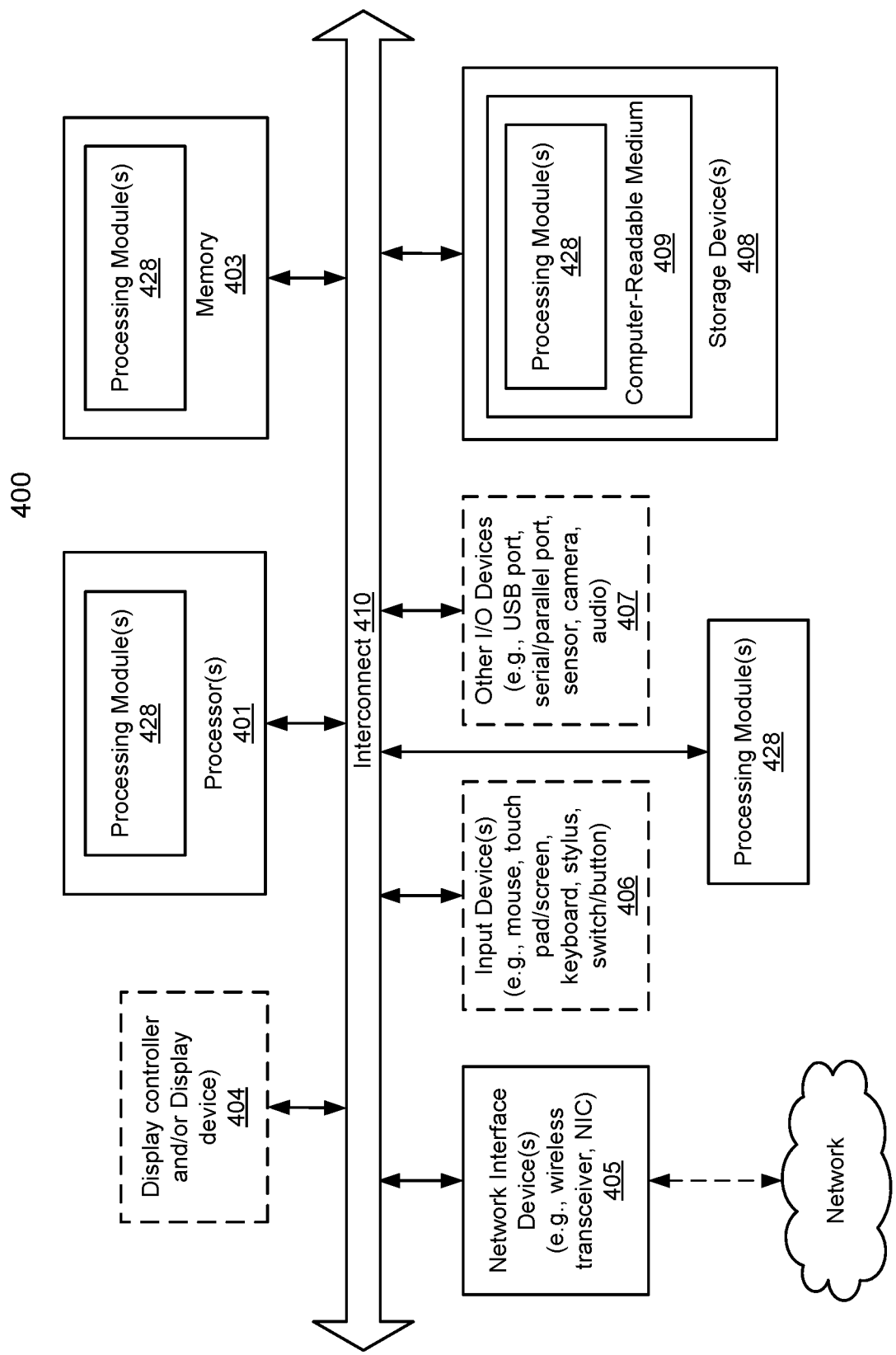

MANAGING OPERATION OF A DATA PROCESSING SYSTEM USING A MANAGEMENT CONTROLLER AND A NETWORK MODULE

FIELD

Embodiments disclosed herein relate generally to managing a data processing system. More particularly, embodiments disclosed herein relate to systems and methods to manage the data processing system using a management controller and a network module.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIG. 4 shows a block diagram illustrating a data processing system in accordance with an embodiment.

DETAILED DESCRIPTION

Figure 1:
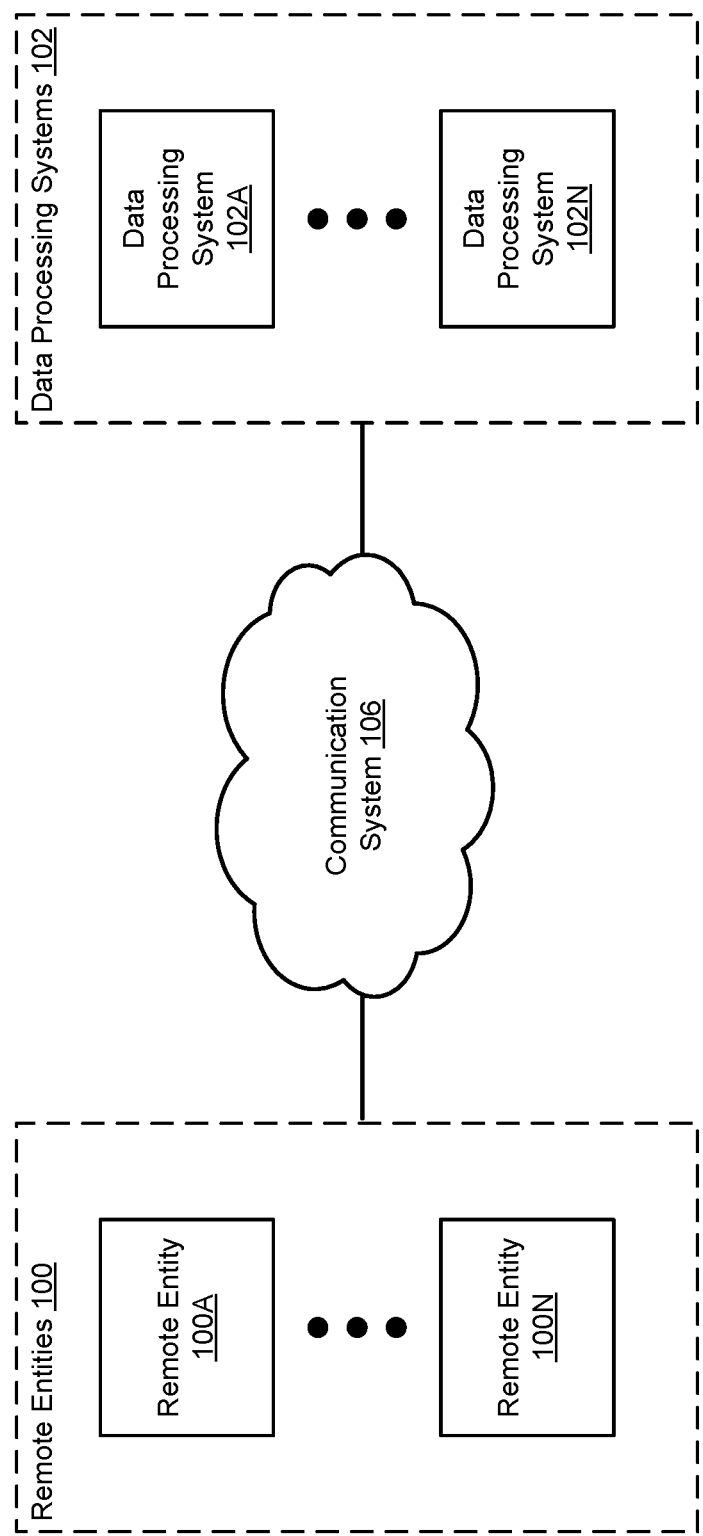
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing a data processing system. The data processing system may provide computer-implemented services to any type and number of other devices and/or users of the data processing system. The computer-implemented services may include any quantity and type of such services.

To provide the computer-implemented services, the data processing system may need to operate in a manner conducive to, for example, execution of applications that provide the computer-implemented services. To provide the computer-implemented services, the applications may utilize certain hardware resources and/or software components hosted by the hardware resources. Over time, a type and/or quantity of the computer-implemented services desired by a user of the data processing system may change.

To update operation of the applications (and/or other components of the data processing system) and, therefore, to provide updated computer-implemented services, a management agent may be hosted by the hardware resources. The management agent may include a program responsible for facilitating use of the hardware resources by various applications to perform the computer-implemented services.

However, compromise of one or more in band components (e.g., the hardware resources) of the data processing system may negatively impact functionality of other in band components. Specifically, if any in band component (e.g., a network stack, a driver) is compromised, the management agent may be vulnerable to compromise. In addition, if the hardware components of the data processing system are depowered, the management agent may be nonfunctional.

Compromise and/or otherwise reduced functionality of the management agent may impede the management agent's ability to implement changes to the computer-implemented services and/or may cause the management agent to be unable to receive transmissions from remote entities attempting to provide instructions to the management agent regarding modifications to the operation of the data processing system, etc.

Consequently, compromise and/or otherwise reduced functionality of the management agent may lead to a reduction in the quality and/or availability of the computer-implemented services to the user of the data processing system.

To modify operation of the data processing system in the event of compromise and/or reduced functionality of one or more in band components of the data processing system, the data processing system may include a management controller. The management controller may operate independently from the hardware resources of the data processing system and may be distinct from the hardware resources. Therefore, the management controller may provide management functionalities for the data processing system regardless of a status of one or more in band components (e.g., the hardware resources).

In addition, the management controller may receive information from and/or provide information to remote entities (e.g., other data processing systems) without the information traversing the in band components and without utilizing a network stack hosted by the hardware resources. To do so, the data processing system may include a network module.

The network module may facilitate in band communications for the hardware resources and out of band communications for the management controller by maintaining multiple network endpoints. For example, a first network endpoint may be usable to direct communications to and from the hardware resources via a first communication channel and a second network endpoint may be usable to direct communications to and from the management controller via a second communication channel.

By doing so, communications usable by the management controller to update the operation of the data processing system may not need to traverse any in band components and, therefore, may be less likely to be compromised in the event of compromise of one or more in band components. In addition, the management controller and network module may be powered by a separate power domain from the hardware resources and, therefore, may remain powered if the hardware resources are depowered. Doing so may increase the quality and/or availability of computer-implemented services to the user of the data processing system.

In an embodiment, a method of managing a data processing system is provided. The method may include: receiving, by a network module of the data processing system, a received data unit comprising control information and a payload; identifying, by the network module, whether the received data unit is addressed to a management controller of the data processing system or hardware resources of the data processing system using the control information; in a first instance of the identifying where the received data unit is addressed to the management controller: providing, by the network module, the payload to the management controller via a first communication channel; and in a second instance of the identifying where the received data unit is addressed to the hardware resources: providing, by the network module, the payload to the hardware resources via a second communication channel.

The method may also include: obtaining, by the network module and via the second communication channel, a first portion of data from the hardware resources and instructions to send the first portion of the data to a first remote entity; adding, by the network module, first control information and the first portion of the data to a first data unit; transmitting, by the network module, the first data unit towards the first remote entity via a network; obtaining, by the network module and via the first communication channel, a second portion of data from the management controller and instructions to send the second portion of the data to a second remote entity; adding, by the network module, second control information and the second portion of the data to a second data unit; and transmitting, by the network module, the second data unit towards the second remote entity via the network.

The network module may host an instance of a transmission control protocol/internet protocol (TCP/IP) stack to facilitate communications via the network.

The management controller may be operably connected to the hardware resources via a third communication channel.

The hardware resources may provide computer-implemented services desired by users of the data processing system.

The management controller may be tasked with managing operation of the hardware resources.

The management controller may operate independent from and may be distinct from the hardware resources.

The network module may be adapted to separately advertise network endpoints for the management controller and the hardware resources, the network endpoints being usable by the first remote entity and the second remote entity to address communications to the hardware resources and the management controller.

The management controller and the network module may be on separate power domains from the hardware resources so that the management controller and the network module are operable while the hardware resources are inoperable.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the method when the computer instructions are executed by the processor.

Figure 2A:
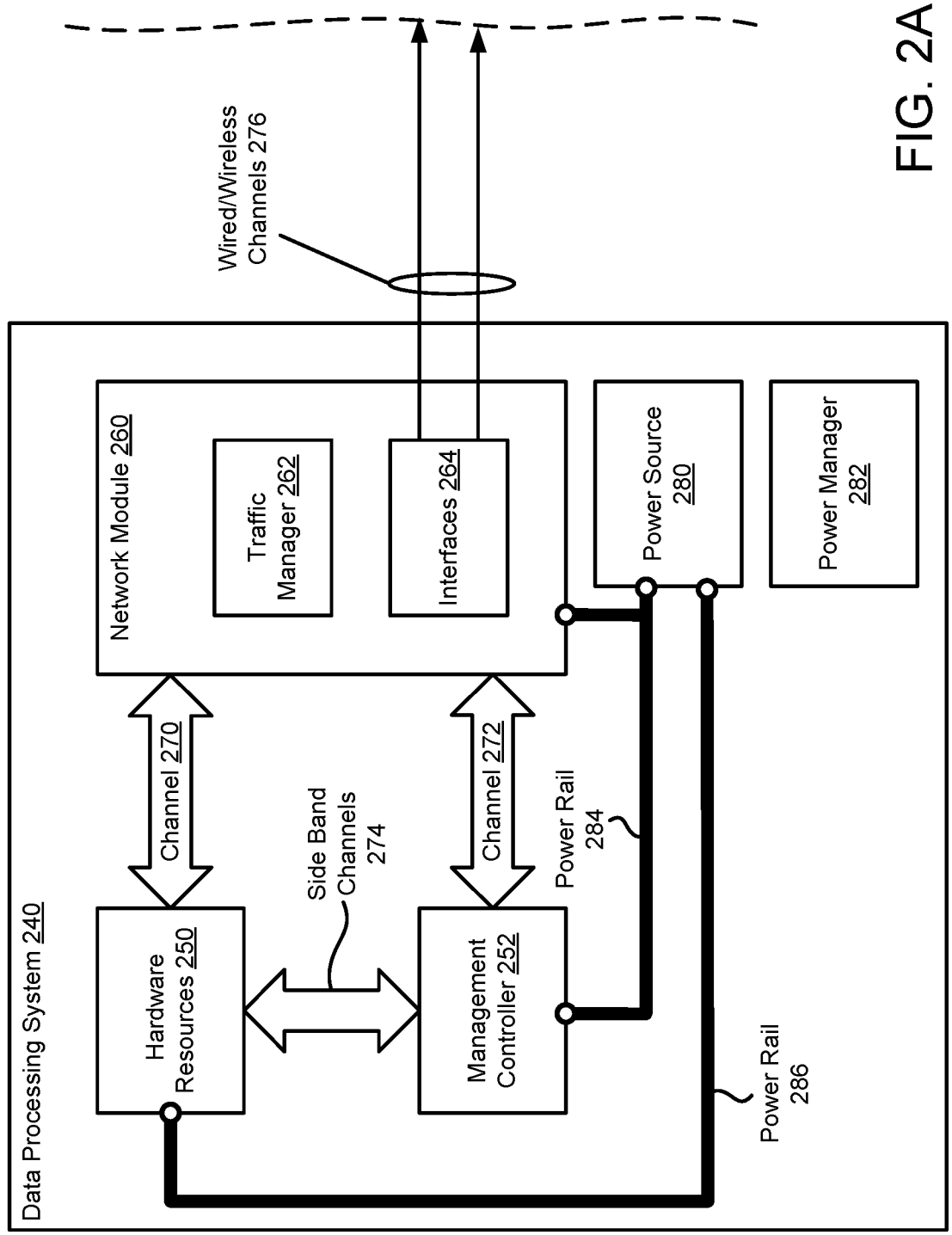
FIG. 2A shows a block diagram illustrating a data processing system in accordance with an embodiment.
Figure 2B:
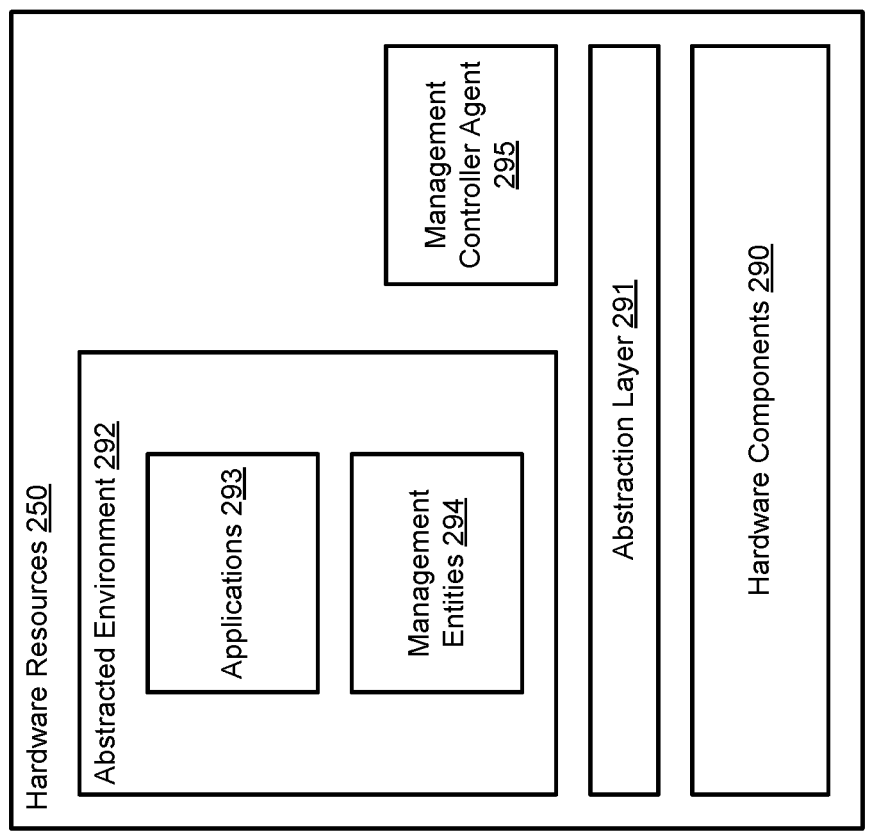
FIG. 2B shows a block diagram illustrating hardware resources of a data processing system in accordance with an embodiment.

Turning to FIG. 1, a block diagram illustrating a system in accordance with an embodiment is shown. The system shown in FIG. 1 may provide for management of data processing systems that may provide, at least in part, computer-implemented services. The system may include any number of data processing systems 102 (e.g., computing devices) that may each include any number of hardware components (e.g., processors, memory modules, storage devices, communications devices). The hardware components may support execution of any number and types of applications (e.g., software components). Changes in available functionalities of the hardware and/or software components may provide for various types of different computer-implemented services to be provided over time. Refer to FIGS. 2A-2B for additional details regarding data processing systems 102.

The computer-implemented services may include any type and quantity of computer-implemented services. The computer-implemented services may include, for example, database services, data processing services, electronic communication services, and/or any other services that may be provided using one or more computing devices. The computer-implemented services may be provided by, for example, remote entities 100, data processing systems 102 and/or any other type of devices (not shown in FIG. 1). Other types of computer-implemented services may be provided by the system shown in FIG. 1 without departing from embodiments disclosed herein.

The computer-implemented services may be provided, at least in part, by hardware resources of data processing systems 102 and the computer-implemented services may be desired by a user of data processing systems 102. Over time, the type and/or quantity of the computer-implemented services desired by the user may change. In order to accommodate modifications to the provided computer-implemented services, operation of the hardware resources and/or software components hosted by the hardware resources (e.g., applications) may be modified.

To update operation of the applications (and/or other components of the data processing system) and, therefore, to provide updated computer-implemented services, a management agent may be hosted by the hardware resources. The management agent may include a program responsible for overseeing how the applications access the hardware resources while providing the computer-implemented services. By modifying the hardware resources and/or software components available for use in performing the computer-implemented services, operation of the data processing system may be modified in response to a request, for example, from a remote entity. To do so, the management agent may utilize various in band components (e.g., the hardware resources) and/or a network stack hosted by the hardware resources to obtain and implement the request.

However, use of the in band components and/or the network stack hosted by in band components may place the management agent at risk of indirect compromise. For example, if any of the in band components trusted by the management agent are compromised, the in band components may compromise the operation of the management agent. Additionally, if various drivers and/or the network stack are compromised, communications to/from remote entities may be compromised. The management agent may suffer reduced functionality for other reasons including, for example, depowering of the hardware resources.

Compromise and/or otherwise reduction in functionality of the management agent may prevent the management agent from receiving communications indicating desired modifications to the operation of the data processing system. Consequently, quality and/or availability of the computer-implemented services may be negatively impacted over time.

In general, embodiments disclosed herein relate to systems, devices, and methods for managing a data processing system (e.g., 102A). To modify operation of data processing system 102A in the event of compromise and/or reduced functionality of one or more in band components of data processing system 102A, data processing system 102A may include a management controller. The management controller may operate independently from the hardware resources of data processing system 102A and may be distinct from the hardware resources. Therefore, the management controller may provide management functionalities for data processing system 102A regardless of a status of one or more in band components (e.g., the hardware resources).

In addition, the management controller may receive information from and/or provide information to remote entities (e.g., other data processing systems) without the information traversing the in band components and without utilizing a network stack hosted by the hardware resources. To do so, data processing system 102A may include a network module.

The network module may facilitate in band communications for the hardware resources and out of band communications for the management controller by maintaining multiple network endpoints. For example, a first network endpoint may be usable to direct communications to and from the hardware resources via a first communication channel and a second network endpoint may be usable to direct communications to and from the management controller via a second communication channel.

By doing so, communications usable by the management controller to update the operation of data processing system 102A may not need to traverse any in band components and, therefore, may be less likely to be compromised in the event of compromise of one or more in band components. In addition, the management controller and network module may be powered by a separate power domain from the hardware resources and, therefore, may remain powered if the hardware resources are depowered. Doing so may increase the quality and/or availability of computer-implemented services to the user of data processing system 102A.

Remote entities 100 may include any number of remote entities (e.g., other data processing systems, management systems, user devices). Each of remote entities may be implemented using a physical device that communicates with data processing systems 102 via communication system 106. Data processing systems 102 may interact with remote entities 100 to receive instructions regarding modifications to operation of data processing systems 102 and/or updates to the computer-implemented services provided by data processing systems 102.

For example, data processing system 102A may be lost or stolen. Remote entity 100A may be a trusted management system that receives an alert that data processing system 102A was lost or stolen from an owner of data processing system 102A. In response to receiving the alert, remote entity 100A may provide instructions to data processing system 102A to discourage use of data processing system 102A by a user that is not the owner (e.g., disabling human interface devices, displaying a message indicating that data processing system 102A is lost). The management controller of data processing system 102A may receive the instructions (via an out of band communication channel) and may implement the instructions.

Any of the components illustrated in FIG. 1 may be operably connected to each other (and/or components not illustrated) with communication system 106.

Communication system 106 may include one or more networks that facilitate communication between any number of components. The networks may include wired networks and/or wireless networks (e.g., and/or the Internet). The networks may operate in accordance with any number and types of communication protocols (e.g., such as the internet protocol).

Communication system 106 may be implemented with one or more local communications links (e.g., a bus interconnecting a processor of any of data processing systems 102 and remote entities 100).

Communication system 106 may include out of band communication channels, in band communication channels, and/or other types of communication channels.

Refer to FIGS. 2A-2B for additional details regarding the management controller, network module, out of band communication channel, and/or hardware resources of data processing systems 102.

Turning to FIG. 2A, a diagram illustrating data processing system 240 in accordance with an embodiment is shown. Data processing system 240 may be similar to any of the data processing systems 102 shown in FIG. 1.

To provide computer-implemented services, data processing system 240 may include any quantity of hardware resources 250. Hardware resources 250 may be in band hardware components, and may include a processor operably coupled to memory, storage, and/or other hardware components. Hardware resources 250 may (e.g., via the processor) provide the computer-implemented services desired by users of data processing system 240.

The processor may host various management entities such as operating systems, drivers, network stacks, and/or other software entities that provide various management functionalities. For example, the operating system and drivers may provide abstracted access to various hardware resources.

To facilitate communication, hardware resources 250 may host a network stack that may facilitate packaging, transmission, routing, and/or other functions with respect to exchanging data with other devices. For example, the network stack may support transmission control protocol/internet protocol communication (TCP/IP) (e.g., the Internet protocol suite) thereby allowing hardware resources 250 to communicate with other devices via packet switched networks and/or other types of communication networks.

The processor may also host various applications that provide the computer-implemented services. The applications may utilize various services provided by the management entities and use (at least indirectly) the network stack to communication with other entities. Refer to FIG. 2B for additional details regarding software entities that may be hosted by hardware resources 250.

However, use of the network stack and the services provided by the management entities may place the applications at risk of indirect compromise. For example, if any of these entities trusted by the applications are compromised, these entities may subsequently compromise the operation of the applications. Additionally, if various drivers and/or the communication stack are compromised, communications to/from other devices may be compromised. If the applications trust these communications, then the applications may also be compromised.

For example, to communicate with other entities, an application may generate and send communications to a network stack and/or driver, which may subsequently transmit a packaged form of the communication via channel 270 to a communication component, which may then send the packaged communication (in a yet further packaged form, in some embodiments, with various layers of encapsulation being added depending on the network environment outside of data processing system 240) to another device via any number of intermediate networks (e.g., via wired/wireless channels 276 that are part of the networks).

To reduce the likelihood of the applications and/or other in band entities from being indirectly compromised, data processing system 240 may include management controller 252 and network module 260. Each of these components of data processing system 240 is discussed below.

Management controller 252 may operate independently from hardware resources 250 and, therefore, hardware resources 250 may not host and/or manage operation of management controller 252. In addition, management controller 252 may be distinct from hardware resources 250 and, therefore, may be physically separate from hardware resources 250. Management controller 252 may also be operably connected to communication components of data processing system 240 via separate channels (e.g., 272) from the in band components.

Management controller 252 may be implemented, for example, using a system on a chip or other type of independently operating computing device (e.g., independent from the in band components, such as hardware resources 250, of a host data processing system 240). Management controller 252 may provide various management functionalities for data processing system 240. For example, management controller 252 may monitor various ongoing processes performed by the in band component, may manage power distribution, thermal management, and/or other functions of data processing system 240.

To do so, management controller 252 may be operably connected to various components (e.g., hardware resources 250) via side band channels 274 (in FIG. 2A, a limited number of side band channels are included for illustrative purposes, it will be appreciated that management controller 252 may communication with other components via any number of side band channels). The side band channels may be implemented using separate physical channels, and/or with a logical channel overlay over existing physical channels (e.g., logical division of in band channels). The side band channels may allow management controller 252 to interface with other components and implement various management functionalities such as, for example, general data retrieval (e.g., to snoop ongoing processes), telemetry data retrieval (e.g., to identify a health condition/other state of another component), function activation (e.g., sending instructions that cause the receiving component to perform various actions such as displaying data, adding data to memory, causing various processes to be performed), and/or other types of management functionalities.

For example, to reduce the likelihood of indirect compromise of an application hosted by hardware resources 250, management controller 252 may enable information from other devices to be provided to the application without traversing the network stack and/or management entities of hardware resources 250. To do so, the other devices may direct communications including the information to management controller 252. Management controller 252 may then, for example, send the information via side band channels 274 to hardware resources 250 (e.g., to store it in a memory location accessible by the application, such as a shared memory location, a mailbox architecture, or other type of memory-based communication system) to provide it to the application. Thus, the application may receive and act on the information without the information passing through potentially compromised entities. Consequently, the information may be less likely to also be compromised, thereby reducing the possibility of the application becoming indirectly compromised. Similar processes may be used to facilitate outbound communications from the applications.

Information provided to the application by management controller 252 may include, for example, instructions for implementation of computer-implemented services desired by users of data processing system 240.

To facilitate communication with other devices, data processing system 240 may include network module 260. Network module 260 may provide communication services for in band components and out of band components (e.g., management controller 252) of data processing system.

In the event that a received data unit is received by network module 260, network module 260 may: (i) receive the received data unit including control information and a payload, and/or (ii) identify whether the received data unit is addressed to a management controller of data processing system 240 (e.g., 252) or hardware resources of data processing system 240 (e.g., 250) using the control information. If the received data unit is addressed to management controller 252, network module 260 may provide the payload to management controller 252 via a first communication channel (e.g., an out of band communication channel such as 272). If the received data unit is addressed to hardware resources 250, network module 260 may provide the payload to hardware resources 250 via a second communication channel (e.g., an in band communication channel such as 270).

In the event that a first data unit is desired to be provided by hardware resources 250 to a first remote entity, network module 260 may: (i) obtain, via the second communication channel, a first portion of data from hardware resources 250 and instructions to send the first portion of the data to the first remote entity (e.g., 100A), (ii) add first control information and the first portion of the data to the first data unit, and/or (iii) transmit, via the first communication channel, the first data unit towards the first remote entity via a network.

In the event that a second data unit is desired to be provided by management controller 252 to a second remote entity, network module 260 may: (i) obtain, via the first communication channel, a second portion of data from management controller 252 and instructions to send the second portion of the data to a second remote entity (e.g., 100N), (ii) add second control information and the second portion of the data to the second data unit, and/or (iii) transmit the second data unit towards the second remote entity via the network.

To provide the above-described functionalities, network module 260 may include traffic manager 262, interfaces 264, and may host an instance of a TCP/IP stack to facilitate communications via the network (not shown). Consequently, network module 260 may facilitate communication with other devices independently of any of the in band components (e.g., does not rely on any hosted software, hardware components, etc.). Accordingly, compromise of any of hardware resources 250 and hosted component may not result in indirect compromise of network module 260, management controller 252, and entities hosted by management controller 252.

Traffic manager 262 may include functionality to (i) discriminate traffic directed to various network endpoints advertised by data processing system 240, and (ii) forward the traffic to/from the entities associated with the different network endpoints. For example, to facilitate communications with other devices, network module 260 may advertise different network endpoints (e.g., different media access control address/internet protocol addresses) for the in band components and out of band components. Thus, other entities may address communications to these different network endpoints. When such communications are received by network module 260, traffic manager 262 may discriminate and direct the communications accordingly (e.g., over channel 270 or channel 272, in the example shown in FIG. 2A, it will be appreciated that network module 260 may discriminate traffic directed to any number of data units and direct it accordingly over any number of channels).

Accordingly, traffic directed to management controller 252 may never flow through any of the in band components. Likewise, outbound traffic from the out of band component may never flow through the in band components.

To support inbound and outbound traffic, network module 260 may include any number of interfaces 264. Interfaces 264 may be implemented using any number and type of communication devices which may each provide wired and/or wireless communication functionality. For example, interfaces 264 may include a wide area network card, a WiFi card, a wireless local area network card, a wired local area network card, an optical communication card, a radio access network (RAN) card, a wide area network (WAN) card, and/or other types of communication components. These components may support any number of wired/wireless channels 276.

Thus, from the perspective of an external device, the in band components and out of band components of data processing system 240 may appear to be two independent network entities, that may independently addressable, and otherwise unrelated to one another.

Network module 260 may utilize the instance of the TCP/IP stack to allow hardware resources 250 and/or management controller 252 to communicate with other devices via packet switched networks and/or other types of communication networks.

To facilitate management of data processing system 240 over time, hardware resources 250, management controller 252 and/or network module 260 may be positioned in separately controllable power domains. By being positioned in these separately controllable power domains, different subsets of these components may remain powered while other subsets are unpowered.

For example, management controller 252 and network module 260 may remain powered while hardware resources 250 is unpowered. Consequently, management controller 252 may remain able to communication with other devices even while hardware resources 250 are inactive. Similarly, management controller 252 may perform various actions while hardware resources 250 are not powered and/or are otherwise inoperable, unable to cooperatively perform various process, are compromised, and/or are unavailable for other reasons.

To implement the separate power domains, data processing system 240 may include a power source (e.g., 280) that separately supplies power to power rails (e.g., 284, 286) that power the respective power domains. Power from the power source (e.g., a power supply, battery, etc.) may be selectively provided to the separate power rails to selectively power the different power domains. A power manager (e.g., 282) may manage power from power source 280 that is supplied to the power rails. Management controller 252 may cooperate with power manager 282 to manage supply of power to these power domains.

In FIG. 2A, an example implementation of separate power domains using power rails 284-286 is shown. The power rails may be implemented using, for example, bus bars or other types of transmission elements capable of distributing electrical power. While not shown, it will be appreciated that the power domains may include various power management components (e.g., fuses, switches, etc.) to facilitate selective distribution of power within the power domains.

Figure 3A:
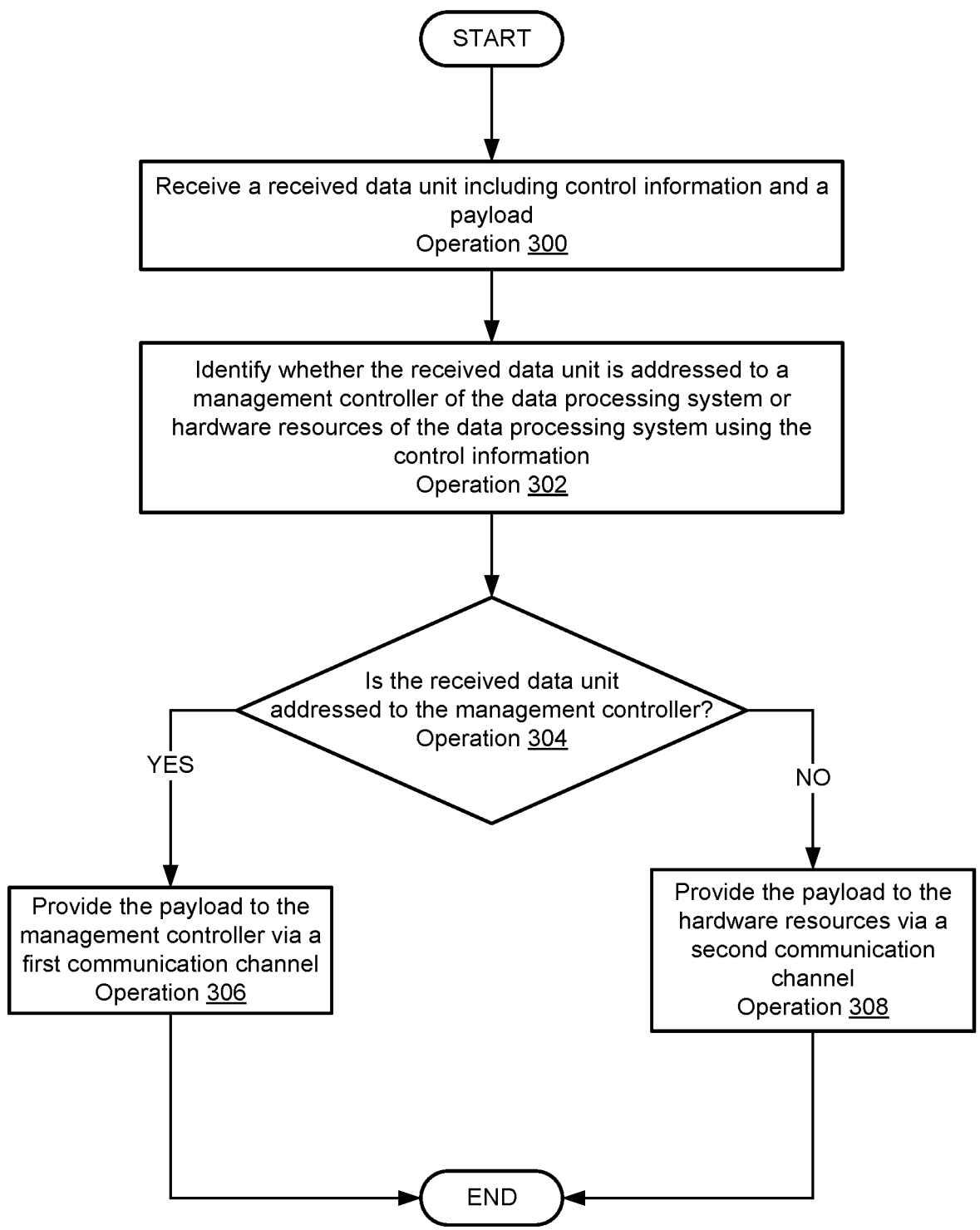
FIG. 3A shows a flow diagram illustrating a method of managing a received data unit in accordance with an embodiment.
Figure 3B:
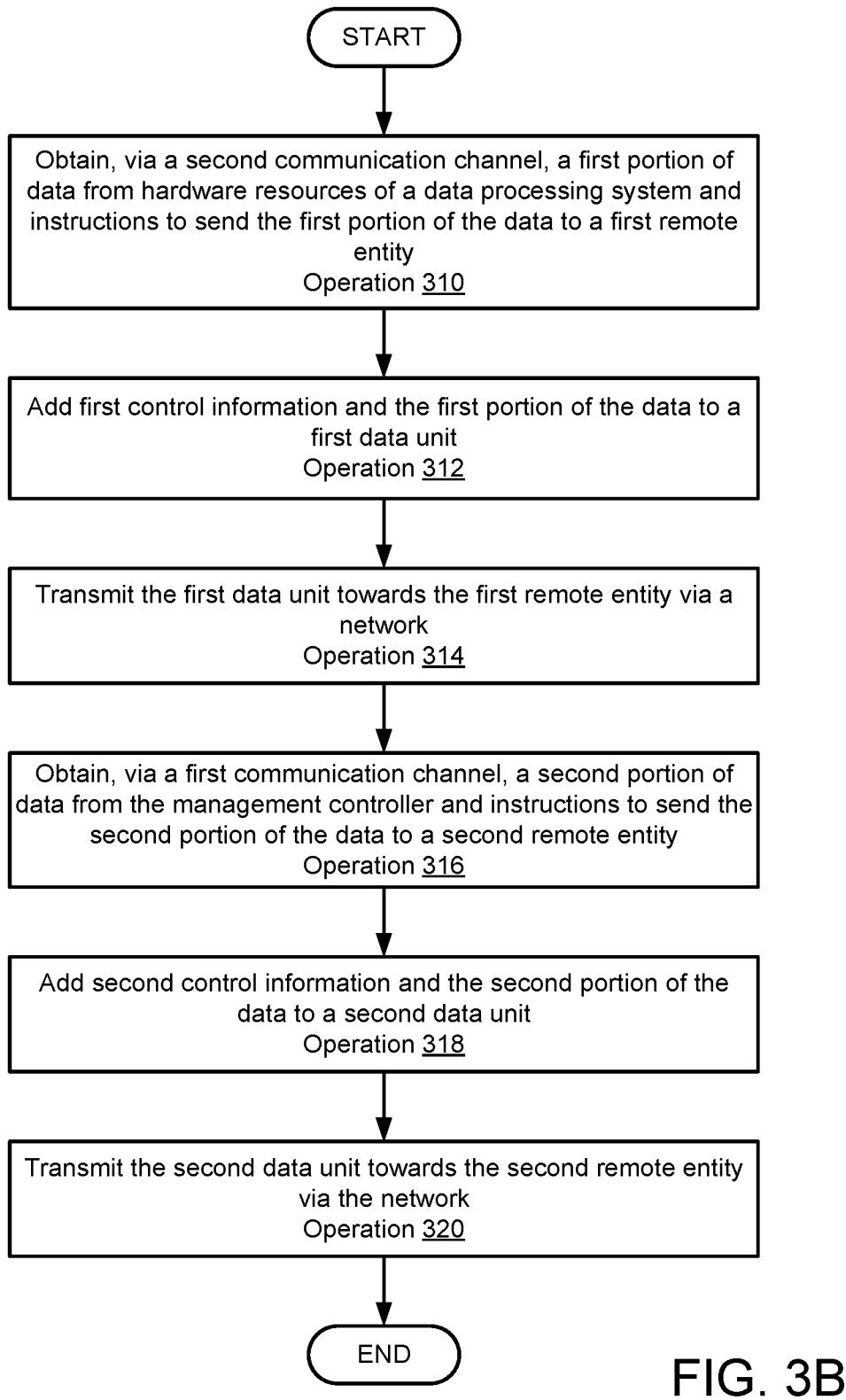
FIG. 3B shows a flow diagram illustrating a method of managing transmission of data units to remote entities in accordance with an embodiment.

When providing its functionality, network module 260 may perform all, or a portion, of the methods and operations described in FIGS. 3A-3B.

While illustrated in FIG. 2A with a limited number of specific components, a system may include additional, fewer, and/or different components without departing from embodiments disclosed herein.

Turning to FIG. 2B, to provide computer-implemented services, hardware resources 250 may host applications 293 and management entities 294. Management entities 294 may include, for example, drivers, operating systems, and/or other entities that facilitate operation of applications 293 by facilitating use of hardware components 290. Hardware components 290 may include processors, memory modules, storage devices, and/or other types of hardware components usable to provide computer-implemented services.

Applications 293 may provide any quantity and type of computer-implemented services using hardware components 290. When operating, applications 293 may use abstracted access to the functionality of hardware components 290 provided by management entities 294. For example, the applications may make calls to an operating system which in turn makes calls to drivers which in turn communicate with the hardware components to invoke their various functionalities.

In an embodiment, hardware resources 250 also hosts abstraction layer 291. Abstraction layer 291 may include software such as hypervisors, dockers, and/or other entities that provide abstracted access to hardware components to various abstracted environments (e.g., 292). The abstracted environments may include virtual machines, containers, etc. Through abstraction layer 291 and abstracted environments, hardware resources 250 may host various instances of management entities and applications that may utilize the functionalities of hardware components 290.

To facilitate cooperation between management controller 252 and hardware resources 250, hardware resources 250 may host management controller agent 295. Management controller agent 295 may be independent from the abstracted environments, and may facilitate communication with and performance of instructions by management controller 252.

For example, management controller agent 295 may include functionality to (i) monitor various abstracted environments, and components therein, (ii) identify operating states (e.g., nominal, stalled, in error of various levels of severity), (iii) obtain information regarding the states of the environments such as, for example, content of virtualized memory, processors, logs of operation of various software and/or abstracted hardware components, (iv) write data to and/or otherwise communicate with the entities in the virtualized environments, (v) make modifications to the virtualized environment and/or entities hosted thereby through invocation of various functions of abstraction layer 291 and/or other entities, (vi) adjust distribution of use of hardware components 290 by the abstracted environment, and/or (vii) perform other types of management actions through which information regarding the operation of entities hosted by abstracted environment 292 may be collected.

While illustrated in FIG. 2B with a limited number of specific components, a system may include additional, fewer, and/or different components without departing from embodiments disclosed herein.

As discussed above, the components of FIG. 1-2B may perform various methods to manage a data processing system. FIGS. 3A-3B illustrate methods that may be performed by the components of FIGS. 1-2B. In the diagram discussed below and shown in FIGS. 3A-3B, any of the operations may be repeated, performed in different orders, and/or performed in parallel with or in a partially overlapping in time manner with other operations.

Turning to FIG. 3A, a flow diagram illustrating a method of managing a received data unit in accordance with an embodiment is shown. The method may be performed, for example, by a network module, and/or any other entity.

At operation 300, a received data unit may be received, the received data unit including control information and a payload (e.g., a message). Receiving the received data unit may include: (i) monitoring any number of network endpoints hosted by a network module for transmissions from remote entities via a network, and/or (ii) identifying a transmission from a remote entity via one of the network endpoints.

At operation 302, it is identified whether the received data unit is addressed to a management controller of a data processing system or hardware resources of the data processing system using the control information. Identifying whether the received data unit is addressed to the management controller or the hardware resources may include: (i) obtaining the control information from the received data unit, (ii) reading the control information to identify an intended recipient for the received data unit, (iii) determining whether the intended recipient is the management controller or the hardware resources, and/or (iv) other methods.

At operation 304, it is determined whether the received data unit is addressed to the management controller. If the received data unit is addressed to the management controller, the method may proceed to operation 306. If the received data unit is not addressed to the management controller (and, therefore, is addressed to the hardware resources), the method may proceed to operation 308.

At operation 306, the payload is provided to the management controller via a first communication channel. Providing the payload to the management controller may include transmitting the payload in the form of a message using the first communication channel, the first communication channel being an out of band communication channel.

Returning to operation 304, the method may proceed to operation 308 if the received data unit is not addressed to the management controller (and, therefore, is addressed to the hardware resources). At operation 304, the payload may be provided to the hardware resources via a second communication channel. Providing the payload to the hardware resources may include transmitting the payload in the form of a message using the second communication channel, the second communication channel being an in band communication channel.

The method may end following operation 308.

Turning to FIG. 3B, a flow diagram illustrating a method of managing transmission of data units to remote entities in accordance with an embodiment is shown. The method may be performed, for example, by a network module, and/or any other entity.

At operation 310, a first portion of data from the hardware resources and instructions to send the first portion of the data to a first remote entity may be obtained via a second communication channel. Obtaining the first portion of the data and the instructions may include: (i) receiving the first portion of the data and the instructions in the form of a message over an in band communication channel of a data processing system, (ii) reading the first portion of the data and the instructions from storage, the storage being shared with the hardware resources, and/or (iii) other methods.

At operation 312, first control information and the first portion of the data may be added to a first data unit. Adding the first control information and the first portion of the data may include: (i) obtaining the first control information, (ii) encapsulating the first control information and the first portion of the data in a data structure, (iii) treating the data structure as the first data unit, and/or (iv) other methods.

Obtaining the first control information may include generating the first control information. The first control information may be generated using at least an intended recipient for the first data unit.

At operation 314, the first data unit may be transmitted towards the first remote entity via a network. Transmitting the first data unit may include: (i) reading an intended recipient from the control information included in the first data unit, (ii) choosing, based on the intended recipient and a network environment of the network, an entity (e.g., an intermediate entity) to transmit the first data unit to, (iii) transmitting the first data unit to the entity via a network endpoint for the entity, and/or (iv) other methods.

At operation 316, a second portion of data from the management controller and instructions to send the second portion of the data to a second remote entity may be obtained via a first communication channel. The first communication channel may be an out of band communication channel. Obtaining the second portion of the data from the management controller and the instructions to send the second portion of the data to the second remote entity may include: (i) receiving the second portion of the data and the instructions in the form of a message over an out of band communication channel of a data processing system, (ii) reading the second portion of the data and the instructions from storage, the storage being shared with the management controller, and/or (iii) other methods.

At operation 318, second control information and the second portion of the data may be added to a second data unit. Adding the second control information and the second portion of the data may include: (i) obtaining the second control information, (ii) encapsulating the second control information and the second portion of the data in a data structure, (iii) treating the data structure as the second data unit, and/or (iv) other methods.

Obtaining the second control information may include generating the second control information. The second control information may be generated using at least an intended recipient for the second data unit.

At operation 320, the second data unit may be transmitted towards the second remote entity via a network. Transmitting the second data unit may include: (i) reading an intended recipient from the second control information included in the second data unit, (ii) choosing, based on the intended recipient and a network environment of the network, an entity (e.g., an intermediate entity) to transmit the second data unit to, (iii) transmitting the second data unit to the entity via a network endpoint for the entity, and/or (iv) other methods.

The method may end following operation 320.

Any of the components illustrated in FIGS. 1-2B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a coprocessor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs, or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method of managing a data processing system, the method comprising:

receiving, by a network module of the data processing system, a received data unit comprising control information and a payload;
identifying, by the network module, whether the received data unit is addressed to a management controller of the data processing system or hardware resources of the data processing system using the control information;
in a first instance of the identifying where the received data unit is addressed to the management controller:
provide, by the network module, the payload to the management controller via a first communication channel;
in a second instance of the identifying where the received data unit is addressed to the hardware resources:
providing, by the network module and without using the management controller, the payload to the hardware resources via a second communication channel;
obtaining, by the network module and directly from the hardware resources via the second communication channel, a first portion of data from the hardware resources;
obtaining, by the network module and directly from the management controller via the first communication channel, a second portion of data from the management controller; and
transmitting, by the network module and via a network, the first portion of the data as a first data unit towards a first remote entity and the second portion of the data as a second data unit towards a second remote entity different from the first remote entity.

2. The method of claim 1, wherein the network module hosts an instance of a transmission control protocol/internet protocol (TCP/IP) stack to facilitate communications via the network.

3. The method of claim 1, wherein the management controller is operably connected to the hardware resources via a third communication channel.

4. The method of claim 1, wherein the hardware resources provide computer-implemented services desired by users of the data processing system.

5. The method of claim 4, wherein the management controller is tasked with managing operation of the hardware resources.

6. The method of claim 5, wherein the management controller operates independent from and is distinct from the hardware resources.

7. The method of claim 1, wherein the network module is adapted as a single module shared and directly used by both the management controller and the hardware resources that separately advertises network endpoints for both the management controller and the hardware resources, the network endpoints being usable by one or more remote entities to address communications to the hardware resources and the management controller.

8. The method of claim 1,
wherein the management controller and the network module are on separate power domains from the hardware resources, the separate power domains originating from a same power source that supplies power to all of the management controller, the network module, and the hardware resources, and
wherein, using the separate power domains, the management controller and the network module are powered on and operable through receiving power from the power source while, at the same time, the hardware resources are powered off and not operable through the power from the power source being cut-off to the hardware resources.

9. The method of claim 1, wherein the management controller is physically and functionally separate from both the hardware resources and the network module.

10. A non-transitory machine-readable medium having instructions stored therein, which when executed by a processor, cause the processor to perform operations for managing a data processing system, the operations comprising:
receiving, by a network module of the data processing system, a received data unit comprising control information and a payload;
identifying, by the network module, whether the received data unit is addressed to a management controller of the data processing system or hardware resources of the data processing system using the control information;
in a first instance of the identifying where the received data unit is addressed to the management controller:
providing, by the network module, the payload to the management controller via a first communication channel; and
in a second instance of the identifying where the received data unit is addressed to the hardware resources:
providing, by the network module and without using the management controller, the payload to the hardware resources via a second communication channel;
obtaining, by the network module and directly from the hardware resources via the second communication channel, a first portion of data from the hardware resources;
obtaining, by the network module and directly from the management controller via the first communication channel, a second portion of data from the management controller; and
transmitting, by the network module and via a network, the first portion of the data as a first data unit towards a first remote entity and the second portion of the data as a second data unit towards a second remote entity different from the first remote entity.

11. The non-transitory machine-readable medium of claim 10, wherein the network module hosts an instance of a transmission control protocol/internet protocol (TCP/IP) stack to facilitate communications via the network.

12. The non-transitory machine-readable medium of claim 10, wherein the management controller is operably connected to the hardware resources via a third communication channel.

13. The non-transitory machine-readable medium of claim 10, wherein the hardware resources provide computer-implemented services desired by users of the data processing system.

14. The non-transitory machine-readable medium of claim 13, wherein the management controller is tasked with managing operation of the hardware resources.

15. The non-transitory machine-readable medium of claim 10, wherein the management controller is physically and functionally separate from both the hardware resources and the network module.

16. A data processing system, comprising:
a processor; and
a memory coupled to the processor to store instructions, which when executed by the processor, cause the processor to perform operations for managing a data processing system, the operations comprising:

receiving, by a network module of the data processing system, a received data unit comprising control information and a payload;
identifying, by the network module, whether the received data unit is addressed to a management controller of the data processing system or hardware resources of the data processing system using the control information;
in a first instance of the identifying where the received data unit is addressed to the management controller:
  providing, by the network module, the payload to the management controller via a first communication channel; and
in a second instance of the identifying where the received data unit is addressed to the hardware resources:
  providing, by the network module and without using the management controller, the payload to the hardware resources via a second communication channel;
obtaining, by the network module and directly from the hardware resources via the second communication channel, a first portion of data from the hardware resources;
obtaining, by the network module and directly from the management controller via the first communication channel, a second portion of data from the management controller; and
transmitting, by the network module and via a network, the first portion of the data as a first data unit towards a first remote entity and the second portion of the data as a second data unit towards a second remote entity different from the first remote entity.

17. The data processing system of claim 16, wherein the network module hosts an instance of a transmission control protocol/internet protocol (TCP/IP) stack to facilitate communications via the network.

18. The data processing system of claim 16, wherein the management controller is operably connected to the hardware resources via a third communication channel.

19. The data processing system of claim 16, wherein the hardware resources provide computer-implemented services desired by users of the data processing system.

20. The data processing system of claim 16, wherein the management controller is physically and functionally separate from both the hardware resources and the network module.

* * * * *